Feb. 6, 1962 D. E. STRAHAN 3,019,747
DISK AND PLANTER COMBINATION
Filed March 14, 1960 2 Sheets-Sheet 1
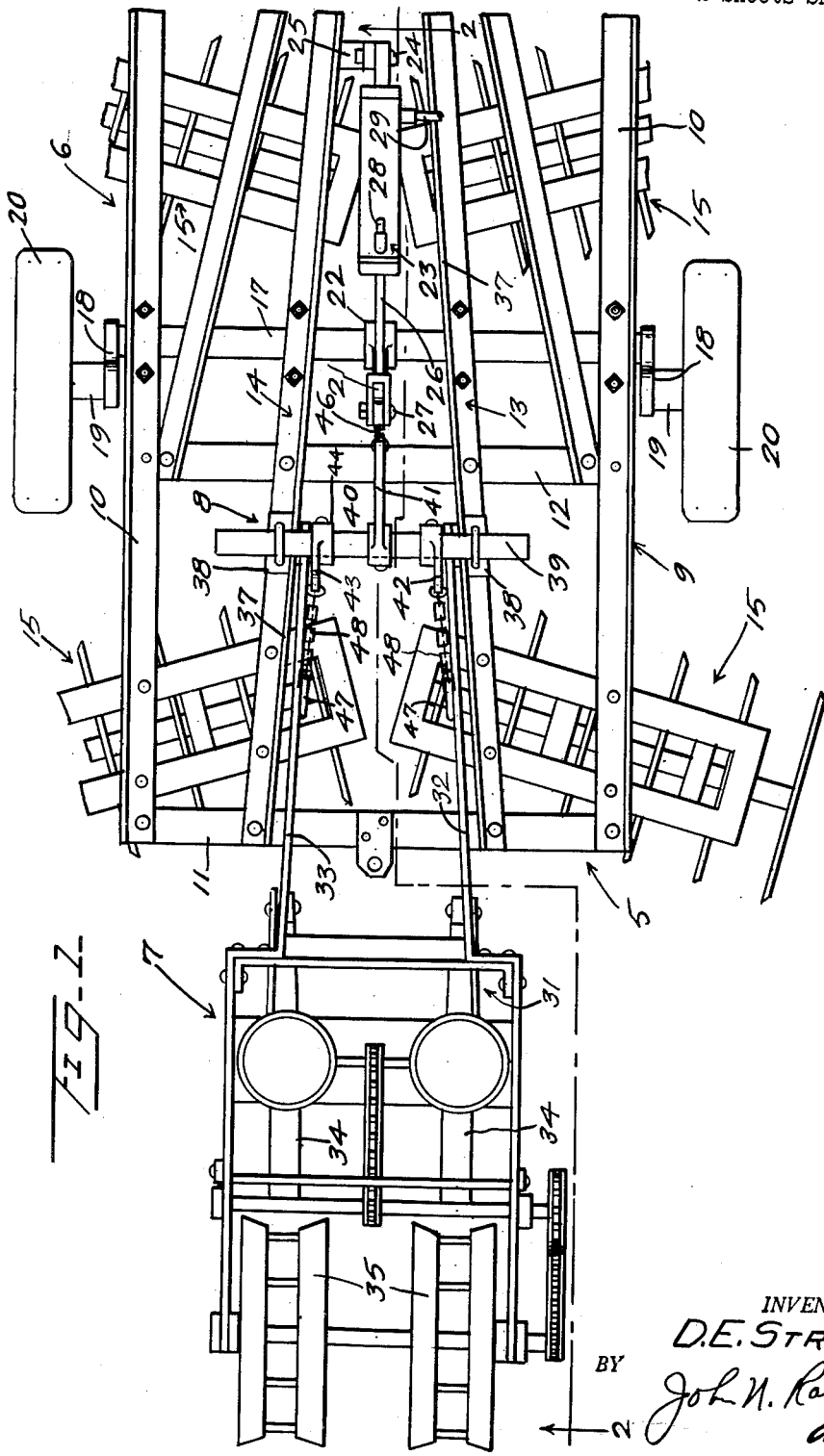
INVENTOR.
D. E. STRAHAN
BY John N. Randolph
atty.

Feb. 6, 1962  D. E. STRAHAN  3,019,747
DISK AND PLANTER COMBINATION
Filed March 14, 1960  2 Sheets-Sheet 2
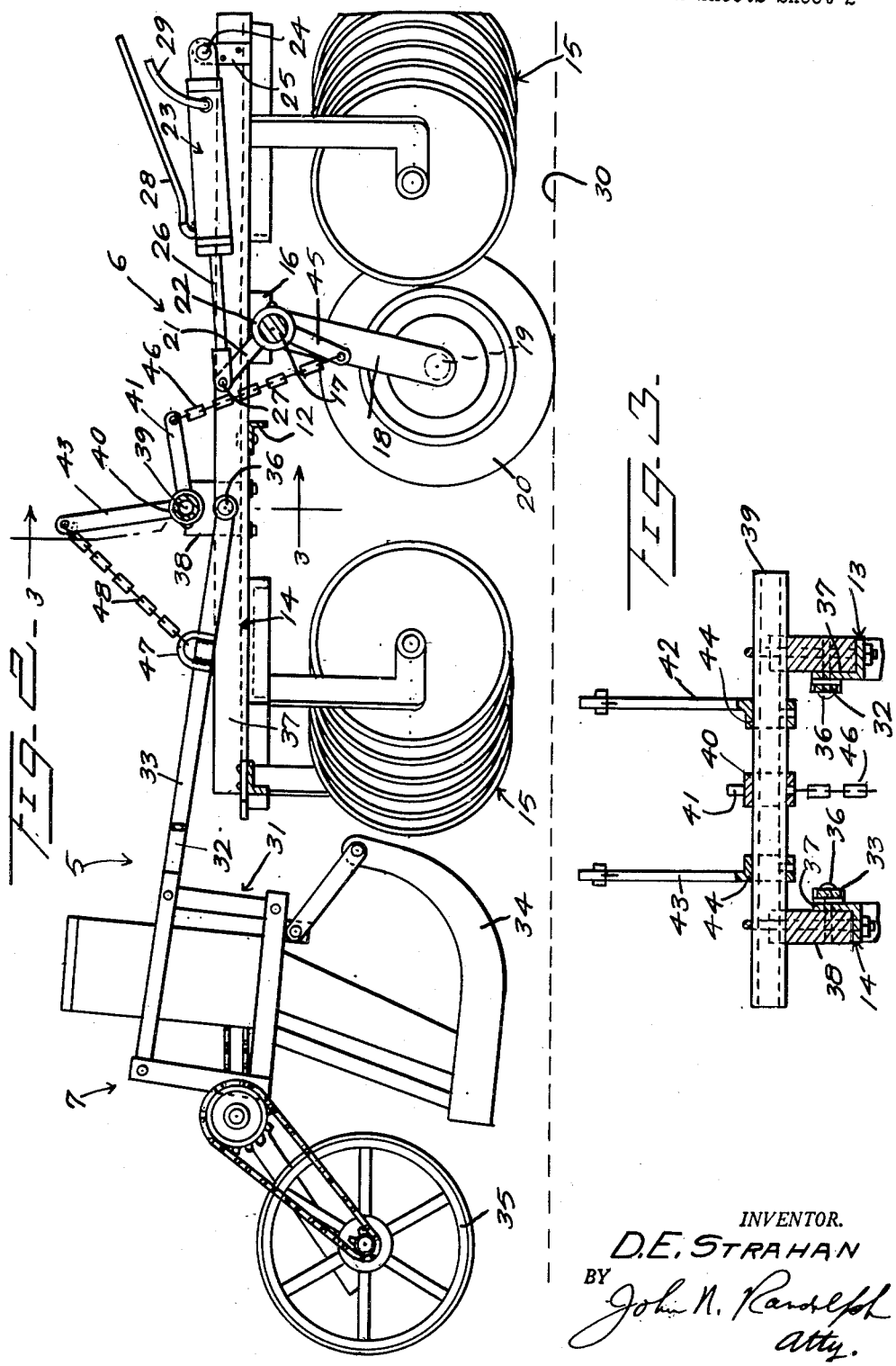
INVENTOR.
D. E. STRAHAN
BY John N. Randolph
atty.

United States Patent Office 3,019,747
Patented Feb. 6, 1962

3,019,747
DISK AND PLANTER COMBINATION
Donald E. Strahan, Weaubleau, Mo.
Filed Mar. 14, 1960, Ser. No. 14,953
2 Claims. (Cl. 111—63)

This invention relates to a combination disk harrow and planter adapted to be utilized for simultaneously cultivating and planting to eliminate the need for performing the two operations separately and so that a tractor will not have to be driven over the earth which has been cultivated.

More particularly, it is a primary object of the present invention to provide a novel connection between a conventional disk harrow and conventional planter which is so constructed that the conventional means utilized for raising and lowering the disk harrow frame and disks may also be employed for raising and lowering the planted simultaneously with the disk harrow frame and also relative to said frame whereby the planter is raised and lowered to a greater extent than the harrow frame and the disks supported thereby.

Still a further object of the invention is to provide a unit for the aforedescribed purpose of extremely simple construction which may be very economically manufactured and sold and which may be readily applied to a conventional disk harrow and planter for operatively coupling the planter to the harrow.

Still another object of the invention is to provide a unit which is so constructed that the planter can be readily disconnected from the disk harrow for use of the disk harrow and planter separately.

Various other objects and advantages of the invention will hereinafter become more fully apparent from the following description of the drawings, illustrating a presently preferred embodiment thereof, and wherein:

FIGURE 1 is a fragmentary top plan view of the disk and planter combination;

FIGURE 2 is a longitudinal sectional view taken substantially along the line 2—2 of FIGURE 1, and FIGURE 3 is a fragmentary transverse sectional view taken approximately along the line 3—3 of FIGURE 2.

Referring more specifically to the drawings, the harrow disk and planter combination in its entirety is designated generally 5 and includes a conventional disk harrow 6, a conventional planter 7, and a coupling unit 8 for coupling the planter to the harrow.

As the harrow 6 is of conventional construction, only a portion thereof, with which the planter 7 and coupling unit 8 are associated, has been illustrated. The planter includes an elongated rectangular frame 9 which includes longitudinally extending side frame members 10, a rear cross member 11, a cross brace 12, disposed forwardly of the cross member 11, and inner longitudinally extending and forwardly converging frame members 13 and 14 which are disposed between the frame members 10. The forward end of the frame 9 or an extension thereof, not shown, is coupled in a conventional manner to a draft vehicle such as a tractor, not shown, so that the frame 9 can have up and down swinging movement relative to its draft vehicle. The frame 9 supports sets of cultivator disks 15 therebeneath, which are of conventional construction and mounted in a conventional manner.

Bearings 16 are secured to the undersides of the frame members 10, 13 and 14 forwardly of the cross member 12 and in alignment with one another to receive and journal an axle 17. The axle 17 has aligned cranks 18 extending downwardly and rearwardly from the ends thereof and beyond the frame sides 10. Said axle cranks 18 at their lower outer ends have aligned outwardly extending stub axles 19 on which ground engaging wheels 20 are journaled.

A lever 21 is secured to the intermediate portion of the axle 17, as by means of a collar 22, and extends upwardly from said axle. A hydraulic ram 23 is pivotally connected at one end by a fastening 24 to a bracket 25 which is secured to and extends inwardly from the frame member 14. The ram 23 extends rearwardly from the bracket 25 and is disposed forwardly of the axle 17. The ram 23 includes a piston rod 26 which extends from the other end thereof over the axle 17 and which is pivotally connected by a fastening 27 to the distal end of the lever 21. Conduits, such as hoses 28 and 29, communicate with and lead from end portions of the ram cylinder 23 and are connected to a suitable source of hydraulic pressure, now shown, for pressurizing either end of the ram cylinder for extending or retracting the piston rod 26.

The parts previously described of the disk harrow are all conventional and have been illustrated and briefly descrebed merely to disclose the relationship of said parts to the coupling unit 8. The ram 23 is shown extended in FIGURES 1 and 2 with the cranks 18 in substantially upright positions so that the frame 9 is elevated and supported solely by the ground wheels 20 with the disks 15 raised above the ground level 30, as illustrated in FIGURE 2, in the transport position of the disk harrow. By pressurizing the rear end of the ram cylinder the piston rod 26 will be retracted to swing the lever 21 clockwise, as seen in FIGURE 2, to cause the axle 17 to turn clockwise in its bearing 16. When this occurs, the frame 9 will swing downwardly and forwardly as seen in FIGURE 2 relative to the wheels 20 as the axle cranks 18 swing downwardly and forwardly in a clockwise direction about the stub axles 19 until the disks 15 engage the ground 30 and assume the support of the frame 9, after which further clockwise turning of the axle 17 will cause the cranks 18 to swing upwardly and rearwardly in a clockwise direction to elevate the wheels 20 out of ground engagement and so that the harrow 6 will then be supported solely by the disks 15 in the operative position of the harrow, as is conventional. It will be understood that during such clockwise turning movement of the axle 17 that the lever 21 will swing clockwise and in a forward direction as the piston rod 26 is drawn from left to right of FIGURES 1 and 2.

The planter 7 may be of any conventional construction including a frame 31 having transversely spaced forwardly extending arms 32 and 33. As illustrated, the planter 7 includes transversely spaced shoes 34 behind each of which is disposed a presser or covering wheel 35.

The planter 7 is disposed behind the disk harrow 6 and the arms 32 and 33 thereof extend forwardly over the rear harrow frame member 11 and between the inner frame members 13 and 14. Fastening elements 36 which are detachably secured to upstanding inner flanges 37 of the frame members 13 and 14 detachably and pivotally connect the forward ends of the arms 32 and 33 to the frame members 13 and 14, respectively, behind and adjacent the cross member 12. The arms 32 and 33, which are rigid with respect to the remainder of the planter frame 31, are pivotally connected by the fastenings 36 to the frame members 13 and 14 for up and down swinging movement of said arms and the planter 7 relative to the harrow frame 9.

Transversely aligned pillow blocks 38 are secured to and extend upwardly from the frame members 13 and 14 on the outer sides of the flanges 37 and behind and adjacent the cross frame member 12 to provide journals for a rock shaft 39 which is disposed above and spaced from the flanges 37. A collar 40 is fixed to the shaft 39, approximately midway between the pillow blocks 38, and has a lever 41 projecting forwardly therefrom. A pair of levers 42 and 43 are secured to the rock shaft 39 by collars 44 which straddle the collar 40 and which are also disposed between the pillow blocks 38. The levers 42 and 43 are disposed in alignment with one another and extend upwardly from the shaft 39 and are disposed approximately at a right angle to the lever 41, in the raised position of the harrow 6 and planter 7, as illustrated in FIGURES 1 and 2. A second lever 45 is fixed to the collar 22 to rotate with the axle 17 and is disposed at an obtuse angle to the lever 21 and extends downwardly and rearwardly from the axle 17, when the lever 21 is inclined upwardly and rearwardly, as seen in FIGURE 2. A nonelastic, preferably flexible connecting element such as a chain 46 is connected to the distal ends of the levers 41 and 45. Bail members 47 are rigidly secured to and extend upwardly from the frame arms 32 and 33 behind and spaced from the pivots 36, and chains 48 or other nonelastic connecting members connect the clevises 47 to the distal ends of the levers 42 and 43, so that the lever 42 is connected by one chain 48 to the frame arm 32 and the lever 43 is connected by the other chain 48 to the frame arm 33.

As previously stated, the harrow frame 9 and disks 15 are shown in their raised positions in FIGURES 1 and 2 of the drawings and the planter 7 is also shown in its raised position in these views with the frame 31 disposed at an incline upwardly and rearwardly relative to the frame 9 from the fastenings 36. The movement of the harrow frame and disks to a lower operative position of the harrow has been previously described, and it will be understood that the fastenings 36 will move downwardly with the frame 9 so that the planter 7 will move downwardly as the frame 9 is displaced downwardly and in unison therewith. In addition, as the planter 7 moves downwardly with the harrow frame 9 it also swings downwardly relative to said harrow frame so that its total downward movement, accomplished as the harrow frame is moving downwardly, is considerably greater than the downward movement of the harrow frame. As previously stated, the axle 17 turns clockwise in its bearings 16 as the frame 9 is swinging downwardly and forwardly. Consequently, the lever 45 turns clockwise, as seen in FIGURE 2, in unison with the axle 17 and lever 21. As this occurs, the weight of the planter 7 which is supported by the chains 48 and levers 42 and 43 causes the rock shaft 39 to turn counterclockwise as the axle 17 turns clockwise so that the levers 41, 42 and 43 will swing in a counterclockwise direction as the levers 45 and 21 turn clockwise. Since the levers 42 and 43 swing downwardly and rearwardly toward the frame 9, the frame arms 32 and 33 are permitted to swing downwardly and rearwardly relative to the frame 9 about their pivots 36 to thus allow the planter 7 to be lowered with the frame 9 and relative thereto so that the planter shoes 34 and presser wheels 35 can assume a proper position to engage the ground 30 at a desired depth. It will be obvious that the connection of the frame arms 32 and 33 by the fastenings 36 to the harrow frame 9 will cause the planter 7 to be drawn behind the harrow.

When it is desired to make a turn at an end of a field or when the implement 5 is not in operation but is being transported, the forward end of the ram cylinder is pressurized to extend the piston rod 26 rearwardly for turning the levers 21 and 45 and axle 17 counterclockwise so that the axle cranks 18 and wheels 20 will first swing downwardly and forwardly until the wheels 20 engage the ground, after which the axle cranks will swing upwardly and rearwardly about the stub axles 29 for elevating the harrow 6 back to its position of FIGURES 1 and 2 and during which movement the planter 7 will be returned to its raised position as seen in these views. Raising of the planter 7 is accomplished by the downward pull exerted on the chain 46 whereby a clockwise torque is transmitted to the rock shaft 39 through the lever 41 for turning the levers 42 and 43 clockwise to exert an upward pull on the chains 48 so that the arms 32 and 33 are swung clockwise about the pivots 36 to elevate the planter 7 relative to the harrow frame 9 as said planter is elevated with the harrow frame relative to the ground 30.

It will be readily apparent that by removing the fastenings 36 and disconnecting the chains 48 either from the levers 42 and 43 or from the bail elements 47, that the planter 7 can be quickly and easily disconnected from the harrow 6, after which the harrow and planter may be utilized separately in a conventional manner unaffected by the presence of the coupling unit 8 attached to the harrow frame.

Various modifications and changes are contemplated and may be resorted to, without departing from the function or scope of the invention as hereinafter defined by the appended claims.

I claim as my invention:

1. In combination with a disk harrow including a frame, sets of disks connected to and disposed beneath the frame, an axle journaled in the frame, cranks projecting laterally from the ends of the axle and having free ends provided with aligned stub axles, ground wheels journaled on the stub axles, and torque imparting means connected to said axle for turning the axle in one direction to lower the wheels and elevate the frame and disks and in the opposite direction to lower the frame and disks and elevate the wheels; a planter disposed behind the harrow frame including a frame having laterally spaced forwardly extending rigid arms disposed over a rear part of the harrow frame; a coupling unit comprising means detachably and pivotally connecting forward free ends of said arms to the harrow frame, said coupling unit being disposed above the level of, behind and parallel to said axle, a rock shaft, means journaling the rock shaft on the harrow frame above, behind, substantially parallel and adjacent to said axle, link and lever means connecting the axle and rock shaft for turning the rock shaft in the opposite direction to the axle when the axle is turned by said torque imparting means in said first mentioned direction for elevating the harrow frame and disks, and a second link and lever means connecting said rock shaft to the planter frame arms behind and spaced from said coupling unit for swinging the arms upwardly about the pivot means of the coupling unit and relative to the harrow frame for elevating the planter relative to the disk harrow as the disk harrow frame is elevated, the weight of said planter acting, through said second link and lever means, for turning the rock shaft in the opposite direction for lowering the planter relative to the harrow frame as the axle is turned in the other direction for lowering the harrow frame and disks and for elevating the ground wheels, said first mentioned link and lever means consisting of levers fixed to and extending from the axle and rock shaft and angularly disposed relative to one another and a nonelastic flexible element connecting the distal ends of said levers and extending between the axle and rock shaft.

2. In a combination as defined by claim 1, said second link and lever means comprising levers fixed to and extending upwardly and rearwardly from the rock shaft, non-elastic flexible elements connected to and extending downwardly and rearwardly from the distal ends of said levers and connected to said arms behind and spaced from said coupling unit.

References Cited in the file of this patent

UNITED STATES PATENTS

| | | |
|---|---|---|
| 2,449,062 | Dewey | Sept. 14, 1948 |
| 2,765,609 | Oehler | Oct. 9, 1956 |
| 2,786,285 | Lindbeck | Mar. 26, 1957 |

FOREIGN PATENTS

| | | |
|---|---|---|
| 1,024,615 | France | Jan. 10, 1953 |